United States Patent
Agarwal et al.

(10) Patent No.: US 7,921,073 B2
(45) Date of Patent: Apr. 5, 2011

(54) SYSTEM AND METHOD FOR DETERMINING IMPRESSION VOLUMES OF CONTENT ITEMS IN A TAXONOMY HIERARCHY

(75) Inventors: Deepak Agarwal, San Jose, CA (US); Dejan Diklic, Foster City, CA (US); Deepayan Chakrabarti, Mountain View, CA (US); Andrei Zary Broder, Menlo Park, CA (US); Vanja Josifovski, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 371 days.

(21) Appl. No.: 11/696,944

(22) Filed: Apr. 5, 2007

(65) Prior Publication Data
US 2008/0250033 A1 Oct. 9, 2008

(51) Int. Cl.
*G06F 7/00* (2006.01)
*G06F 17/00* (2006.01)
(52) U.S. Cl. .......................... 707/603; 707/607; 707/776
(58) Field of Classification Search .................... 707/100
See application file for complete search history.

(56) References Cited

U.S. PATENT DOCUMENTS

| | | | |
|---|---|---|---|
| 6,466,918 B1 * | 10/2002 | Spiegel et al. | 705/27 |
| 6,640,218 B1 * | 10/2003 | Golding et al. | 1/1 |
| 6,978,263 B2 * | 12/2005 | Soulanille | 1/1 |
| 7,136,875 B2 * | 11/2006 | Anderson et al. | 1/1 |
| 7,464,079 B2 * | 12/2008 | Soulanille | 1/1 |
| 2003/0088562 A1 * | 5/2003 | Dillon et al. | 707/5 |
| 2004/0044658 A1 * | 3/2004 | Crabtree et al. | 707/3 |
| 2004/0225562 A1 * | 11/2004 | Turner | 705/14 |
| 2005/0021397 A1 * | 1/2005 | Cui et al. | 705/14 |
| 2005/0144067 A1 * | 6/2005 | Farahat et al. | 705/14 |
| 2006/0143084 A1 * | 6/2006 | Donnelli et al. | 705/14 |
| 2006/0259455 A1 * | 11/2006 | Anderson et al. | 707/1 |
| 2007/0022005 A1 * | 1/2007 | Hanna | 705/14 |
| 2007/0027901 A1 * | 2/2007 | Chan et al. | 707/102 |
| 2007/0094073 A1 * | 4/2007 | Dhawan et al. | 705/14 |
| 2007/0124425 A1 * | 5/2007 | Gross | 709/217 |
| 2007/0156677 A1 * | 7/2007 | Szabo | 707/5 |
| 2007/0214132 A1 * | 9/2007 | Grubb et al. | 707/5 |

(Continued)

OTHER PUBLICATIONS

Jean-Luc Gauvain et al., Maximum a Posteriori Estimation for multivariate Gaussian Mixture Observations of Markov Chains, Apr. 1994, IEEE Transactions on Speech and Audio Processing, vol. 2, No. 2, 291-298.*

(Continued)

*Primary Examiner* — Pierre M Vital
*Assistant Examiner* — Taelor Kim
(74) *Attorney, Agent, or Firm* — Seth H. Ostrow; Ostrow Kaufman LLP

(57) ABSTRACT

Described are a system and method for determining an event occurrence rate. A sample set of content items may be obtained. Each of the content items may be associated with at least one region in a hierarchical data structure. A first impression volume may be determined for the at least one region as a function of a number of impressions registered for the content items associated with the at least one region. A scale factor may be applied to the first impression volume to generate a second impression volume. The scale factor may be selected so that the second impression volume is within a predefined range of a third impression volume. A click-through-rate (CTR) may be estimated as a function of the second impression volume and a number of clicks on the content item.

9 Claims, 6 Drawing Sheets

U.S. PATENT DOCUMENTS

| | | | | |
|---|---|---|---|---|
| 2007/0288514 | A1* | 12/2007 | Reitter et al. | 707/104.1 |
| 2008/0046411 | A1* | 2/2008 | Lee | 707/3 |
| 2008/0077504 | A1* | 3/2008 | Gausebeck et al. | 705/26 |
| 2008/0120278 | A1* | 5/2008 | Roe et al. | 707/3 |
| 2008/0140591 | A1* | 6/2008 | Agarwal et al. | 706/12 |
| 2008/0215623 | A1* | 9/2008 | Ramer et al. | 707/104.1 |

OTHER PUBLICATIONS

Yong Soo Kim et al., Development of a Recommender System Based on Navigational and Behvioral Patterns of Customers in e-Commerce Sites, 2005, Korean Advanced Institute of Science and Techonology, Expert Systems with Applications, Elsevier Ltd, pp. 381-393.*

Patrali Chatterjee et al., Modeling the Clickstream: Implications for Web-Based Advertising Efforts, 2003, INFORMS and JSTOR, vol. 22, No. 4, pp. 520-541.*

Yong Soo Kim et al., 'Development of a recommender system based on navigational and behavioral patterns of customers in e-commerce sites', 2005, Korean Advanced Institute of Science and Techonology, Expert Systems with Applications, Elsevier Ltd, pp. 381-393.*

* cited by examiner

SYSTEM AND METHOD FOR DETERMINING IMPRESSION VOLUMES OF CONTENT ITEMS IN A TAXONOMY HIERARCHY

CROSS REFERENCE TO RELATED APPLICATION

The present application is related to co-pending U.S. patent application Ser. No. 11/637,524, entitled "SYSTEM AND METHOD FOR MATCHING OBJECTS BELONGING TO HIERARCHIES," filed on Dec. 12, 2006, and published under U.S. Patent Publication No. 2008/0140591, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to determining an event occurrence rate. More specifically, the present invention relates to estimating an occurrence rate for events aggregated at multiple resolutions through hierarchical data structures.

BACKGROUND OF THE INVENTION

Web advertising is typically implemented according to two general schemes: content match and sponsored search. Content match refers to placement of advertisements ("ads") within a webpage on the basis of the content of the web page. Sponsored search refers to placing ads on a search results page generated by a web search engine, the ads being responsive to a query that a given user submits to the web search engine. The ads placed on the search results page are selected via analysis of a query string entered into the web search engine. Those of skill in the art recognize that other factors or parameters beyond the query string may influence the selection of ads for placement on a search results page that the web search engine generates including a score that indicates the quality of the ad, a time zone of the user, user browsing history, demographic information, etc. A content match system can generate data indicating each instance that an ad is displayed on a webpage (an "impression").

An ad network, an intermediary entity that selects the ad in the content match system, determines a most relevant ad to place on the webpage to entice a user to click on that ad. For example, on a webpage related to sports, the ad network may select ads for soft drinks, because a demographic of visitors interested in sports may be substantially similar to a demographic likely to buy soft drinks. By computing a ratio of a number of clicks on the ads to a number of impressions, the ad network can determine a click-through-rate (CTR) indicative of, inter alia, the relevancy of the ads that are selected. Thus, the CTR becomes a valuable indicator for ad networks seeking to attract business from advertisers. However, the number of clicks is typically very low compared to the number of impressions. Conventional estimation algorithms based on frequencies of event occurrences incur high statistical variance and fail to provide satisfactory predictions of the CTR because the number of clicks appears negligible in view of the large amount of impressions. Furthermore, estimating CTR from entire corpus of data might involve storing information for each impression. In a content matching system, however, this might involve crawling pages and storing the entire page content, which is expensive both in terms of storage and bandwidth requirements.

Therefore, there exists a need for a reliable sampling model for determining an occurrence of a rare event within large volumes of data.

SUMMARY OF THE INVENTION

The present invention generally relates to systems and methods for determining an event occurrence rate. A sample set of content items may be obtained. Each of the content items may be associated with at least one region in a hierarchical data structure. According to one embodiment, a hierarchical data structure comprises nodes in an advertisement taxonomy hierarchy and nodes in a page taxonomy hierarchy, with a given region characterized or otherwise identified by a combination of nodes from the advertisement taxonomy hierarchy and nodes from the page taxonomy hierarchy. A first impression volume may be determined for the at least one region as a function of a number of impressions registered for the content items associated with the at least one region. A scale factor may be applied to the first impression volume to generate a second impression volume. The scale factor may be selected so that the second impression volume is within a predefined range of a third impression volume. A click-through-rate (CTR) may be estimated as a function of the second impression volume and a number of clicks on the content item.

The content items may include at least one of webpages and ads. The obtaining of the sample set may include identifying first content items that have been clicked, identifying a predetermined number of second content items that have not been clicked, and generating the sample set as a function of the first and second content items. The first impression volume may be calculated as a function of the impressions for the first and second content items. The third impression volume may be a total number of impressions associated within a pre-selected level in the hierarchical data structure. A difference impression volume may be calculated as a difference between the first impression volume and the third impression volume, and the difference impression volume may be distributed to the at least one region as a function of the first impression volume. The distributing may include determining a sum of the first impression volumes for each region across a level of the hierarchical data structure, computing a ratio of the first impression volume for a given region to the sum, multiplying the difference impression volume by the ratio to determine an impression addition for the given region, and adding the impression addition to the first impression volume of the given region to generate a fourth impression volume. Estimating the CTR may include assigning a state variable to each of the at least one region, and applying a Markovian model to the state variable to estimate the CTR. The Markovian model may compute a posterior for the state using a Kalman filter, propagate the posterior to the at least one region, and repeat the computing and the propagating until convergence. Upon the convergence, the CTR for the at least one region may be identified and stored on a storage medium.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
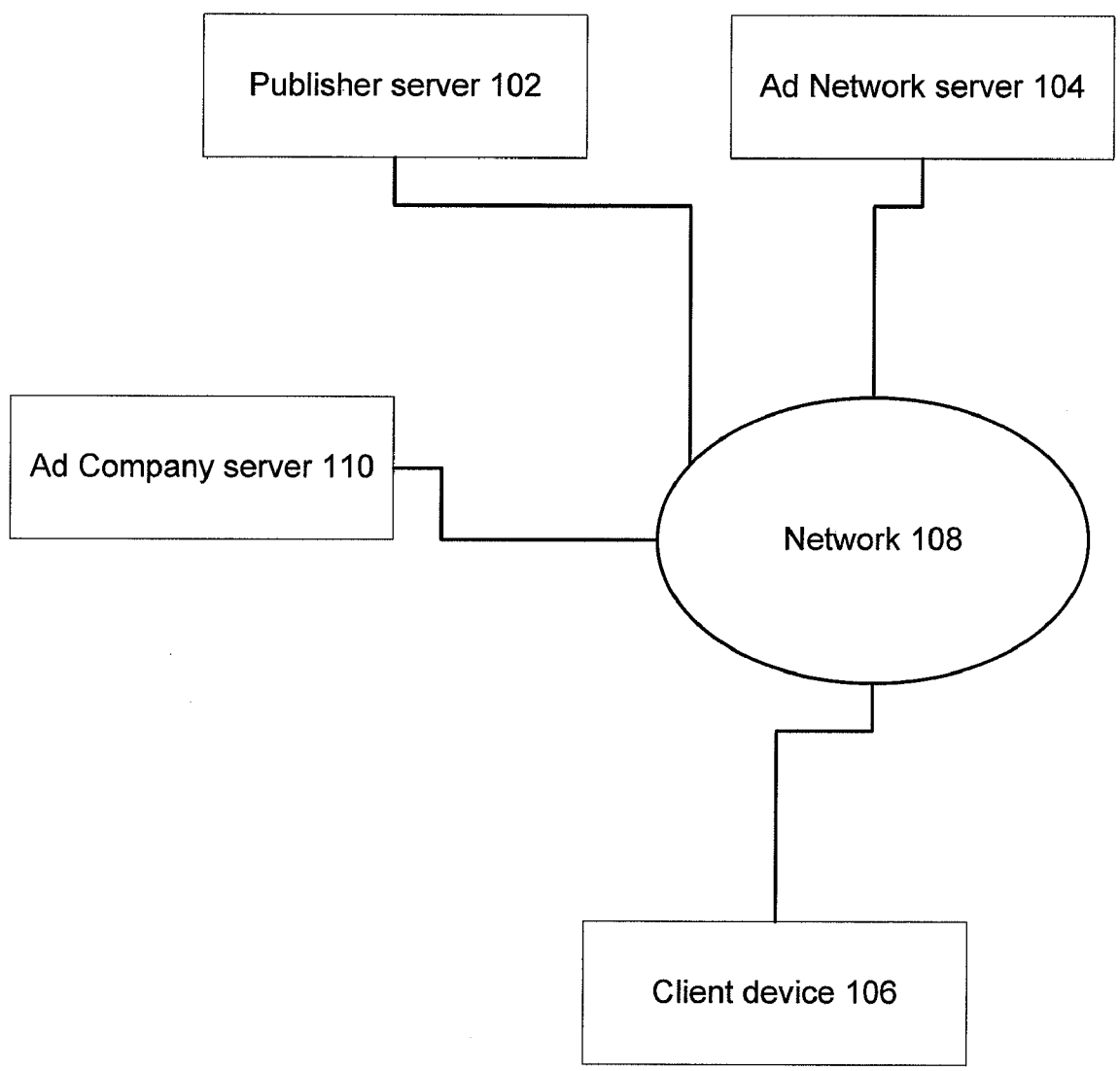
FIG. 1 shows an exemplary embodiment of a system for determining an event occurrence rate according to one embodiment of the present invention.

FIG. 1 shows an exemplary embodiment of a system 100 for determining an event occurrence rate according to the present invention. The system 100 may comprise a publisher server 102, an ad network server 104 and a client device 106 which are communicatively interconnected via a communications network 108 (e.g., a wired/wireless LAN/WAN, a cellular network, the Internet, an intranet, a VPN, a PSTN, etc.). The publisher and ad network servers 102, 104 and the client device 106 may be processor-based computing devices which include memory and network connection ports for communicating data on the network 108. For example, the client device 106 may be a PC, laptop, mobile phone, PDA, tablet computer, handheld computer, smart appliance (e.g., scanner, copier, facsimile machine), etc. which utilizes a web browser (or command-line interface) for allowing a user to interface with devices on the network 108 and view content items (e.g., webpages, ads, videos, audio files, etc.). Those of skill in the art understand that any number of client devices 106 may be connected to the network 108 and that the servers 102 may comprise any number of servers and/or databases.

The publisher server 102 may host one or more webpages that include text, audio, video and/or interactive content (e.g., games, Flash programs, etc.). The webpages may also include ad space (e.g., blank space on the webpage in which an ad may be displayed). A company operating the publisher server 102 may generate revenue by displaying the ads on the webpages. The ads may be hosted by the ad network server 104 or an ad company server 110 (e.g., a repository with company/product-specific ads). When the browser on the client device 106 requests the webpage from the publisher server 102, the ad network server 104 selects an ad (usually based on an agreement with the website owner and the advertiser) from its own database (or retrieves the selected ad from the ad company server 110) and transmits the selected ad to the client device 106. Displaying the ad on the webpage is typically referred to as an "impression." The user then sees the selected ad as a part of the webpage that was requested.

Along with using rules defined in website owner-advertiser agreements to select ads, the ad network server 104 may also implement a content match application. The content match application may include a crawler module which indexes content on various webpages and ads available to be served by the ad network server 104. Using the indices, the ad network server 104 may select an ad that is most likely to be clicked by the user. The ad network server 104 may generate data recording the impressions and the clicks on served ads for calculating a click-through-rate (CTR), e.g., a percentage of ads that were served and clicked. The CTR may be a valuable statistic for the ad network to demonstrate to advertisers the efficacy of the content match application.

In an exemplary embodiment of the present invention, the CTR may be estimated at one or more resolutions of webpage/ad hierarchy. That is, the webpages and ads may be classified (manually or automatically) into a pre-existing hierarchy in which nodes in the hierarchy are associated with contextual themes (e.g., skiing→winter sports→sports). The web pages/ads may be associated with a give node based on the resolution thereof. That is, the more themes used to describe a webpage/ad, the further to the fringe the webpage/ad will be in the hierarchy.

While the exemplary embodiments will be described with reference to a single hierarchy used by both the webpages and the ads, those of skill in the art will understand that the webpages and the ads may utilize mutually exclusive and/or overlapping hierarchies. The hierarchy may be a tree comprising a single root node that extends into a plurality of leaf nodes. One or more of the leaf nodes may be identified as comprising a region of the tree. For example, a parent node and its children nodes, a plurality of nodes with a common ancestor node or sharing a common theme may be considered a region, or a region may be identified by the contextual theme (e.g., swimming→summer sports→sports).

Figure 2:
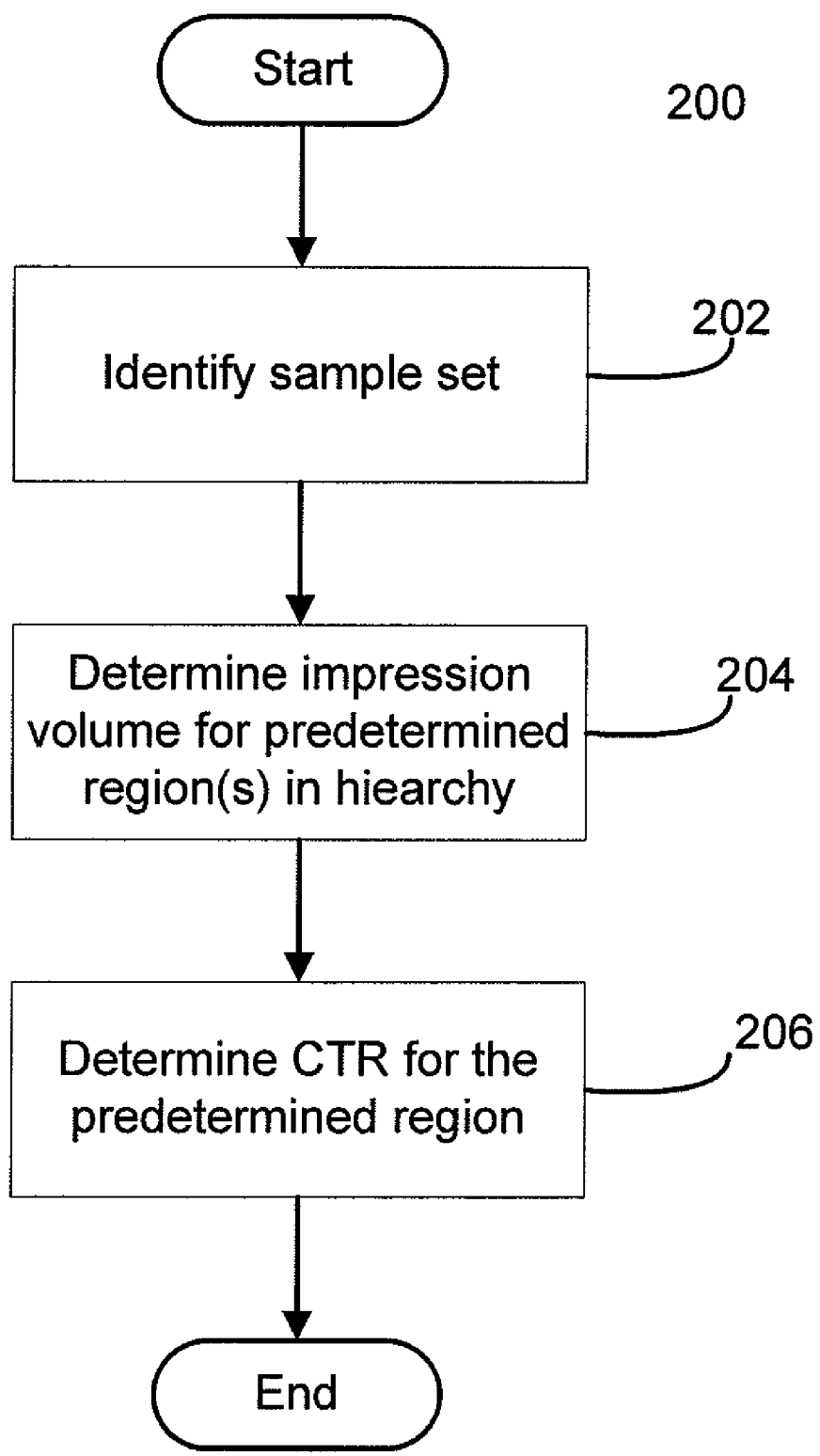
FIG. 2 shows an exemplary embodiment of a method for determining an event occurrence rate according to one embodiment of the present invention.

FIG. 2 shows an exemplary embodiment of a method 200 for determining an event occurrence rate according to the present invention. The method 200 provides an overview of the exemplary steps for determining an event occurrence rate according to the present invention, and, as such, implementation of each of the steps will be described in further detail below. In step 202, a sample set of webpages is identified. The sample set may include a predetermined number of webpages on which ads have been served by the ad network server 104, including the webpages/ads that have been clicked. The webpages in the sample set may be gleaned from, for example, a log maintained by the ad network server 104. In step 204, impression volumes are determined, based on true impression data for the webpages in the sample set, for regions in the hierarchy. In step 206, the determined impression volumes and actual numbers of clicks in a given region are used to determine the CTR(s) for the region. The CTR computed may be computed for any resolution within the hierarchy, allowing for discrimination between regions which truly have negligible CTR from those which may obtain more clicks if provided with more impressions, as will be explained further below.

Figure 3:
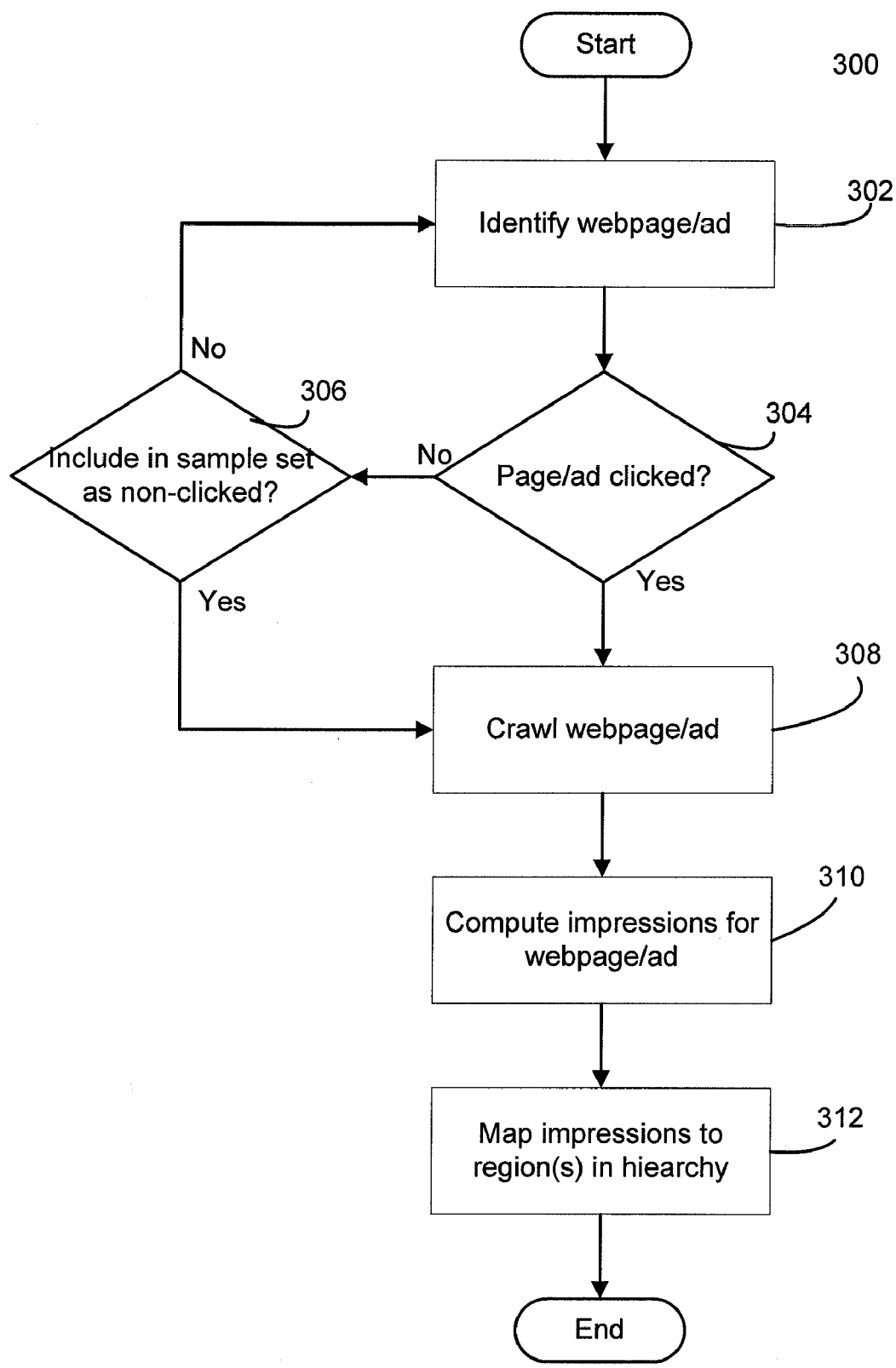
FIG. 3 shows an exemplary embodiment of a method for generating a sample set of webpages/ads according to one embodiment of the present invention.

FIG. 3 shows an exemplary embodiment of a method 300 for generating the sample set of webpages/ads. In step 302, a webpage is identified. The webpage may be one of the webpages that was indicated on the log at the ad network server 104 as registering as impression. In step 304, it is determined whether the webpage was clicked. If the webpage was not clicked, it is determined whether the webpage should be included in the sample set as a non-clicked webpage (step 306).

In step 308, the page is crawled to obtain features thereof for classification into a region of the hierarchy. The features on a webpage include, but are not limited to, a URL, an HTML tag(s), words, images, scripts, etc. As understood by those of skill in the art, features on the ads may be available from the log or other pre-recorded data identifying (or providing data for identifying) the features.

A number of the non-clicked webpages included in the sample set may be predetermined or determined automatically when harvesting the pages (e.g., as a function of a total number of webpages in the log, a total number of webpages clicked, a total number of impressions, etc.), step 310. In step 312, the impressions associated with the webpage are mapped onto regions in the hierarchy corresponding to the features of the webpage. This yields the number of sampled impressions in each of the regions. The method 300 may be iterated over all of the webpages in the sample set, resulting in a hierarchy which reflects all of the sampled impressions in each of the regions. Because the impressions associated with the sample set of webpages are relatively small (as compared to the total number of impressions recorded), the hierarchy may not fully reflect true impression volumes for all of the regions.

Figure 4:
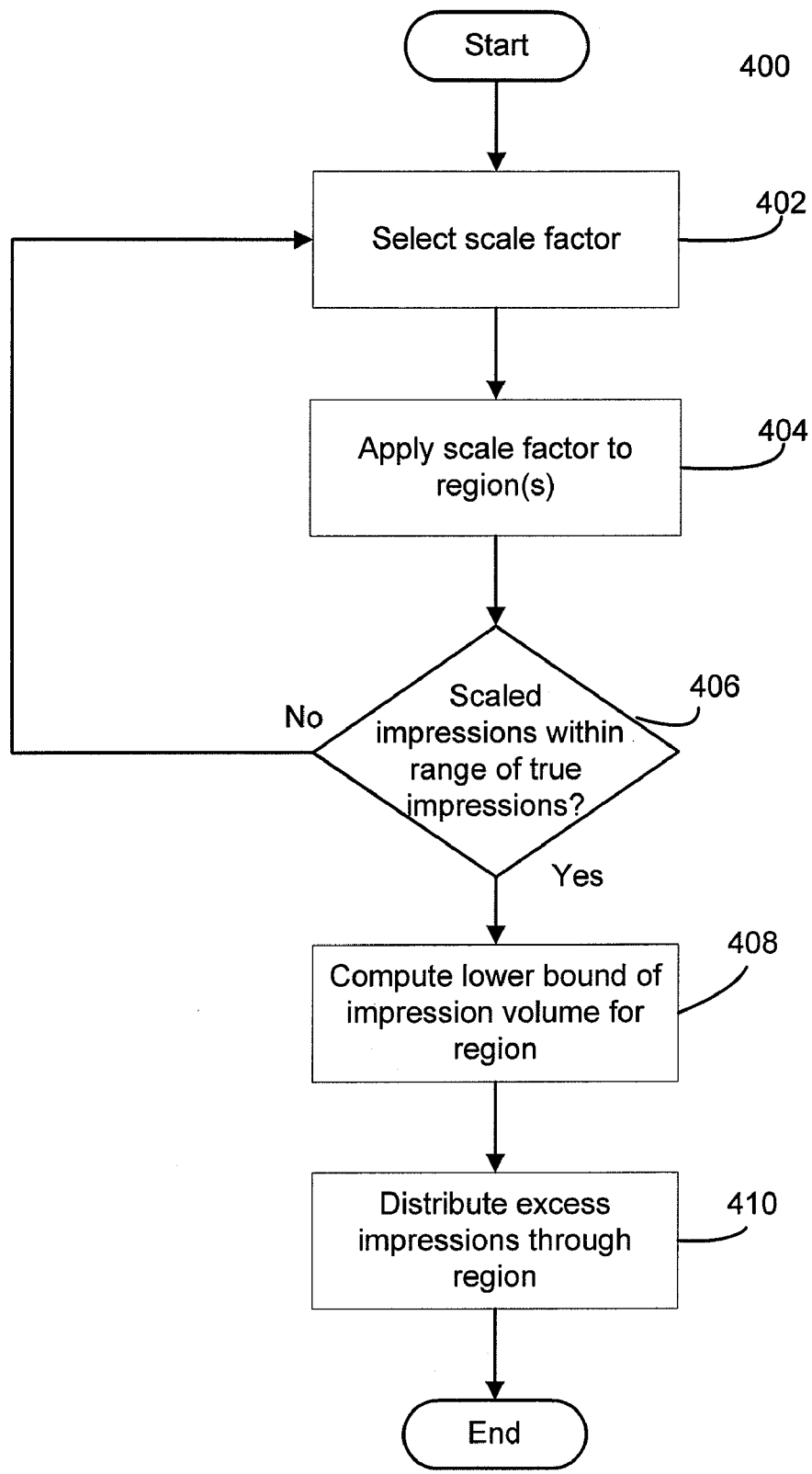
FIG. 4 shows an exemplary embodiment of a method for determining impression volumes at a predetermined node(s) in a webpage/ad hierarchy according to one embodiment of the present invention.

FIG. 4 shows an exemplary embodiment of a method 400 for determining impression volumes at a predetermined node(s) in the hierarchy using the sample impression at another region(s). In step 402, a scale factor is determined, and, in step 404, the scale factor is applied to all nodes across a level of the hierarchy. In step 406, it is determined whether the total number of true impressions indicated in the log is substantially equal to (e.g., within a predefined error bound) the sampled impressions for the predetermined node multiplied by the scale factor. If the totals are incongruous, the scale factor may be modified.

In step 408, a lower bound on impression volume is computed for each of the regions. The lower bound may be, for example, the total number of sampled impressions in each of the respective regions. In step 410, excess impressions (e.g., the total number of scaled impressions in a region minus the lower bound of sampled impressions in the region), may be distributed among the respective regions. That is, by conforming estimated impression volumes to the scaled impression totals at each node in the page and ad hierarchies, a variance of the estimated impression volumes may be reduced. Additionally, a sum of the estimated impression volumes for children regions nested within a parent region should correlate to the estimated impression volume of the parent region. As will be explained further below, the excess impressions may be imputed to some (or all of) the nodes using a maximum entropy formulation.

Figure 5:
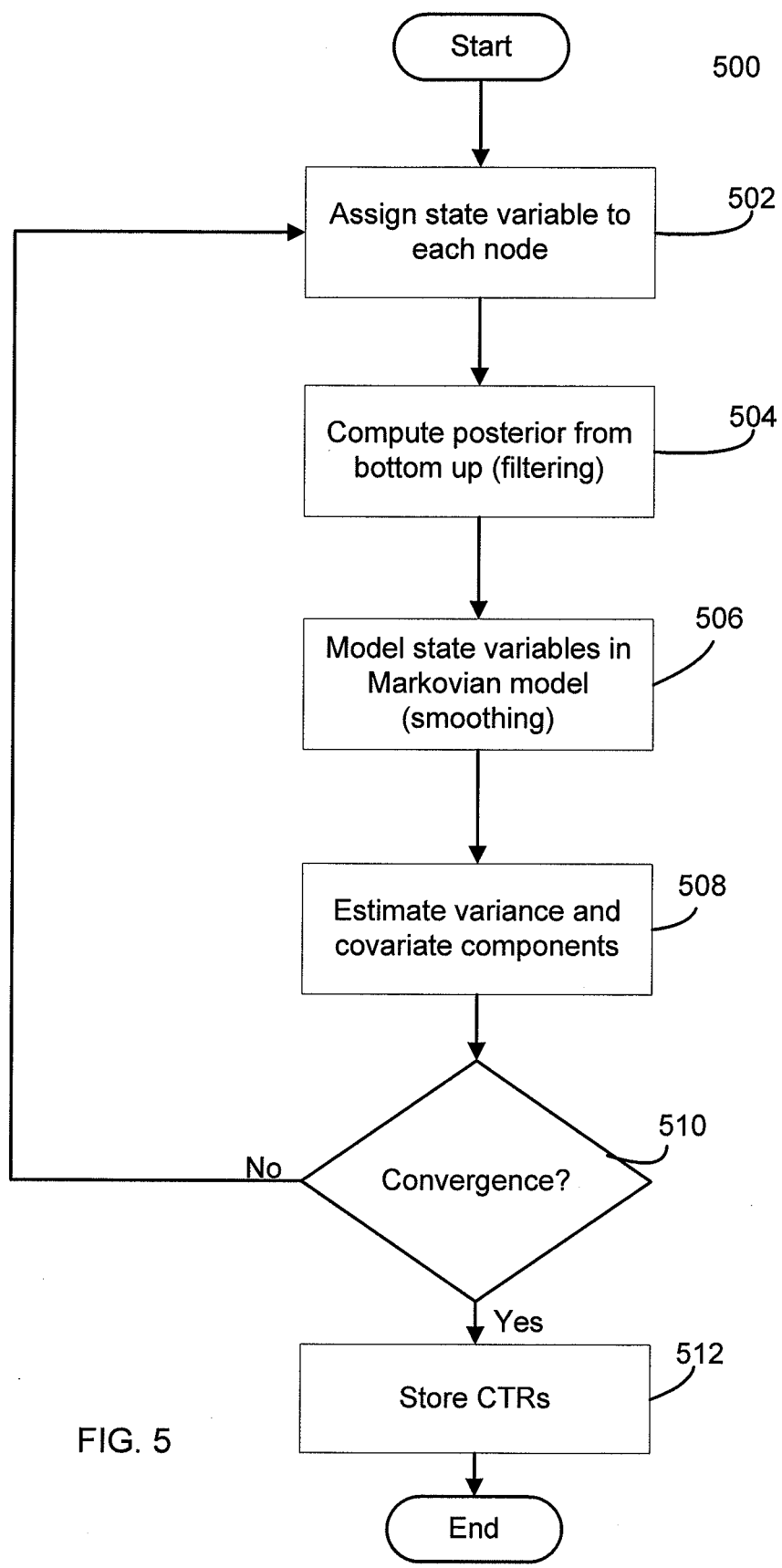
FIG. 5 shows an exemplary embodiment of a method for estimating a click-through-rate in one or more regions of a webpage/ad hierarchy according to one embodiment of the present invention.

FIG. 5 shows an exemplary embodiment of a method 500 for estimating the CTR in one or more regions of the hierarchy using the estimated impression volumes. In step 502, a state variable is assigned to each node in the hierarchy. In step 504, a posterior of each of the state variables is computed for each node from fringe leaf nodes to the root node. The posterior may be computed by, for example, a Kalman filter algorithm that "filters" the leaf nodes in a bottom-up fashion to the root node.

In step 506, a smoothing effect may be applied to modify the state variables. The smoothing effect may be the result of applying a Markovian model on the state variables. That is, since the state variables of child nodes sharing a common parent node are drawn from a distribution centered around the state variable of the parent, the Markovian model may specify a joint distribution on an entire state space of CTR values.

In step 508, variance components of the Markovian model may be estimated using, for example, an Expectation-Maximization (EM) algorithm. The EM algorithm may repeat steps 504 (filtering) and 506 (smoothing) for several iterations until convergence (step 510). When convergence is reached, the resulting CTR values may be stored on a storage device for output and/or additional processing. In step 512, the resulting CTR values may be stored on a storage medium.

A more detailed exemplary embodiment of determining and imputing impression volumes is described below. A set of regions Z may consist of two successive levels of nested regions corresponding to depths 1 and 2, respectively. Generalization to all regions formed by the page and ad hierarchies may follow as: let IJ and ij denote regions in $Z^{(1)}$ and $Z^{(2)}$, respectively. The actual impressions in region r from the clicked and non-clicked pages (e.g., as described with reference to the method 300) may be denoted as $n_r$ and $m_r$, respectively. Thus, $lb_r = n_r + m_r$ may provide a lower bound on the impression volume for the region r. Let $N_r$ denote the true impression volume in region r that is to be estimated may be denoted as $N_r$. Using a linear transformation $x_r = N_r lb_r$, the estimation problem may be written in terms of $x_r$ and derive estimates of $N_r$ as $N_r = x_r + lb_r$, where $x_r$ is our estimate of $x_r$. In fact, the $x_r$'s may be interpreted as excess impressions that may be allocated to adjust for a sampling bias.

A page (or ad) classified to a node i in the tree may belong to the entire path from a node i to the root node. Also, the page (or ad) may be classified to a node at a depth other than leaf node L—leaf level. As understood by those of skill in the art, this classification scheme has the potential to create inconsistencies in a total number of impressions and clicks obtained at different levels in the tree. For instance, the total number of impressions (or clicks) for a group of children regions may be strictly smaller than the number of impressions (or clicks) of the parent region they are nested within. To ensure consistency, the excess impressions and clicks in a parent node are distributed among the children nodes associated therewith. The steps are repeated at every level in a top-down fashion. Thus, each impression in a non-leaf region is guaranteed to come from some smaller region nested within it.

One or more constraints may be imposed while imputing the impression volumes as described in the method 400. A first set of constraints (e.g., column constraints) may ensure that a sum of the impressions along a column is substantially equal to a total number of impressions for a corresponding node in the ad hierarchy:

$$\Sigma x_{ij} = a_j \Sigma lb_{ij} = CS_j^{(2)}; \text{ for all } j \text{ in Level 2} \quad (1)$$

$$\Sigma x_{IJ} = a_J \Sigma lb_{IJ} = CS_J^{(1)}; \text{ for all } J \text{ in Level 1} \quad (2)$$

In the exemplary column constraint, $a_j(a_J)$ is the total impression volume for node j(J) in the ad hierarchy, and $CS_x^{(n)}$ represents the excess impressions in the column that were missed by the sampling process. For a node J at level 1 in the ad hierarchy, $a_J = \Sigma_{j:pa(j)=J} a_j$, where pa(j) denotes the parent node of node j, e.g., the column impressions total for a level 1 node is the sum of the column totals of its children in level 2. Also, $\Sigma CS_j^{(2)} = \Sigma CS_J^{(1)} = \text{TotExcess}$, where TotExcess is the total number of excess impressions in the data.

A second set of constraints (e.g., row constraints) may preserve the impression volumes at nodes in the page hierarchy as follows:

$$\Sigma x_{ij} = K^{(2)} \Sigma m_{ij} = RS_i^{(2)}; \forall i$$

$$\Sigma x_{IJ} = K^{(1)} \Sigma m_{IJ} = RS_I^{(1)}; \forall I \quad (3)$$

In the second set of constraints, $RS_X^{(n)}$ represents the excess impressions aggregated for each node in the page hierarchy, and $K^{(1)}$ and $K^{(2)}$ are constants for levels 1 and 2. The underlying assumption is that for each sampled impression, there are $K^{(n)}$ times as many excess impressions from the non-clicked pool that did not appear in the sample. Since pages may be randomly sampled from the non-clicked pool, this simple adjustment is reasonable. The constants $K^{(n)}$ are chosen to preserve total impression volume, e.g., so that $\Sigma RS_i^{(2)} = \Sigma RS_I^{(1)} = \text{TotExcess}$.

A third set of constraints (e.g., block constraints) may ensure that the excess impressions allocated to a region at level 1 equals the sum of excess impression allocated to regions nested within it at level 2 as follows:

$$\Sigma_{i:j:pa(ij)=IJ} x_{ij} = x_{IJ}; \text{ for all } IJ \quad (4)$$

As understood by those of skill in the art, true impression volumes may satisfy the block constraints. Thus, the block constraints may be imposed during the imputation of impression volumes. Additionally, analogous row, column and block constraints may be imposed at all other levels l (l=0, . . . , L).

In estimating the impression volumes, a set of positive initial prior values $\{x_r(0)\}$ may be identified for all regions rEZ. An aim of the exemplary embodiments of the present invention is to determine a solution $\{x_r\}$ which is as close as possible to the prior initial value $\{x_r(0)\}$ but satisfies all the row, column and block constraints. As understood by those of skill in the art, this process may be equivalent to finding a solution having a smallest discrepancy from the prior distribution in terms of Kullback-Leibler divergence, subject to the constraints. It may also be referred to as a Maximum Entropy model, because, when the prior initial value $\{x_r(0)\}$ is uniform, the solution may maximize Shannon entropy.

In one exemplary embodiment, the Maximum Entropy model may be solved using an Iterative Proportional Fitting (IPF) algorithm, which iterates cyclically over all of the constraints and updates the $x_r$ values to match the constraints as closely as possible. Specifically, at the $t^{th}$ iteration, if: a constraint of the form $\Sigma_r k_r x_r = C$ is being violated ($k_r = 0$ or 1 for all of the constraints); the current value C(t) of the LHS is $C(t) = \Sigma_r k_r x_r(t)$, where $C_t \neq C$; then, the IPF algorithm adjusts each element $x_r$ involved in the constraint by a constant factor $C/C(t)$ to get the new values $x_r(t+1) = x_r(t) \cdot C/C(t)$. Updating in this manner may ensure non-negativity of a final solution. The updates may be performed for all constraints until convergence.

The exemplary embodiment of the present invention may jointly estimate all $x_r$'s by iterating through a series of top-down and bottom-up scalings. For a two level tree, at the $t^{th}$ iteration, start with level 1, and modify $\{x_{IJ}(t)\}$ to $\{x_{IJ}(t+1)\}$ after adjusting for the row and column constraints. This changes the values of $\{x_{ij}(t)\}$'s at level 2 to $\{x^*_{ij}(t)\}$'s by adjusting for the corresponding block constraints. At level 2, change the $\{x^*_{ij}(t)\}$'s to $\{x_{ij}(t+1)\}$'s by adjusting for row and column constraints. This completes the top-down step. In the bottom-up step, the leaf regions (in the exemplary embodiment, the regions at level 2 do not change, e.g., $x_{ij}(t+2) = x_{ij}(t+1)$. Using the block constraints, the values at level 1 change to $\{x^*_{ij}(t+1)\} = \Sigma_{i:j:pa(ij)=IJ} x_{ij}(t+2)$ followed by row and column scalings to satisfy the level 1 constraints, ending with $x_{IJ}(t+2)$. The top-down and bottom-up steps may be iterated until convergence. The algorithm may converge rapidly, requiring, for example, 156 iterations for an error tolerance of 1%.

The exemplary algorithm described above with reference to a two-level tree may be extended to a tree with l levels as follows:

---

Initialization:
    Begin with a prior $\{x_r(0)\}$ for regions r E $Z^{(1)}$ of level 1
From iteration t to t + 2:
    Begin Top-down:
        For all r E $Z^{(1)}$, $x_r(t) \rightarrow$ row constraints $\rightarrow$
            column constraints $\rightarrow x_r(t + 1)$
        For levels l = 2, . . . , L
            For all r E $.Z^{(1)}: x_r(t) \rightarrow$
                block constraints with $x_{pa(r)}(t + 1)$ on the RHS $\rightarrow x^*_r(t)$,
                where pa(r) is the parent region subsuming r
            $x^*_r(t) \rightarrow$ row constraints $\rightarrow$
                column constraints $\rightarrow x_r(t + 1)$
    Begin bottom-up:
        For all r E $Z^{(L)}$, $x_r(t + 2) = x_r(t + 1)$
        For levels l = L, . . . , 1
            For all r E $Z^{(e)}$: $x_r.(t + 1) = \Sigma_{kEch(r)} x_k(t + 1)$,
                where ch(r) are all children regions nested within r
            $x^*_r(t + 1) \rightarrow$ row constraints $\rightarrow$
              column constraints $\rightarrow x_r(t + 2)$
Iterate until all constraints are substantially satisfied up to a
    predefined accuracy factor

---

One exemplary variable in the exemplary imputation algorithm is the choice of the prior. Setting $x_r(0)$ is proportional to $lb_r$ may ensure that the excess impressions are distributed in proportion to the lower bounds obtained from the crawled sample as closely as possible subject to the constraints. An alternative is to simply use the traditional IPF algorithm, which starts with a prior of $x_r(0)$ that is proportional to 1, and computes the $x_r$ values for each level separately, using only the row and column constraints. It can be shown that this automatically satisfies the block constraints as well, due to the relationships between the row and column sums at different levels. However, the prior distributes the excess impressions using an independence model and does not incorporate the a priori interaction information in the lower bounds.

After the impression volumes have been imputed to the hierarchy, the CTRs are estimated for all (or selected ones) of the nodes therein. The distribution of raw CTRs may be skewed and the variance may depend on the mean (roughly, Var proportional to mean/$N_r$). In the exemplary embodiment, the count data may be modeled on a transformed scale using the Freeman-Tukey transformation:

$$y_r = \frac{1}{2}\left(\sqrt{\frac{c_r}{\hat{N}_r}} + \sqrt{\frac{c_r + 1}{\hat{N}_r}}\right), \quad (5)$$

In the above transformation, $c_r$ is the number of clicks in the region r and $N_r$ is the imputed number of impressions, determined from the imputation algorithm described above. The second term in the transformation distinguishes between zeros on the basis of the number of impressions, e.g., zero clicks from 100 impressions corresponds to a smaller transformed CTR than zero clicks from only 10 impressions. The transformation may also provide symmetry to an otherwise skewed rate distribution and provide a variance stabilization property, making the variance of the distribution independent of the mean (roughly, Var proportional to $1/N_r$). In an alternative exemplary embodiment, a squared-root transform may be utilized to model the data on a transformed scale.

As stated above in the description of method 500, the Markov model may be used as a generative model to calculate the CTRs from the imputed impression volumes. In the exemplary dataset, $u^T_r = 1$ for all r which corresponds to one covariate for each level in the region hierarchy. Conditional on the states $\{S_r\}$ being known, assume the observations $y_r$ to be independently distributed as a Gaussian:

$$y_r | S_r, \beta^{(d(r))} \sim N(u_r^T \beta^{(d(r))} + S_r, V_r), \quad (6)$$

The $\beta^{(d(r))}$ is the unknown coefficient vector attached to covariates at level $d(r)$, and $V_r$ is the unknown variance parameter. The latent $S_r$ variables are adjusting for effects that are not accounted for by the covariates. However, estimating one $S_r$ per region leads to severe overfitting; hence smoothing on $S_r$'s is necessary. The smoothing step is performed by exploiting dependencies induced by the tree structure of regions:

$$S_r = S_{pa(r)} + w_r, \quad (7)$$

Figure 6:
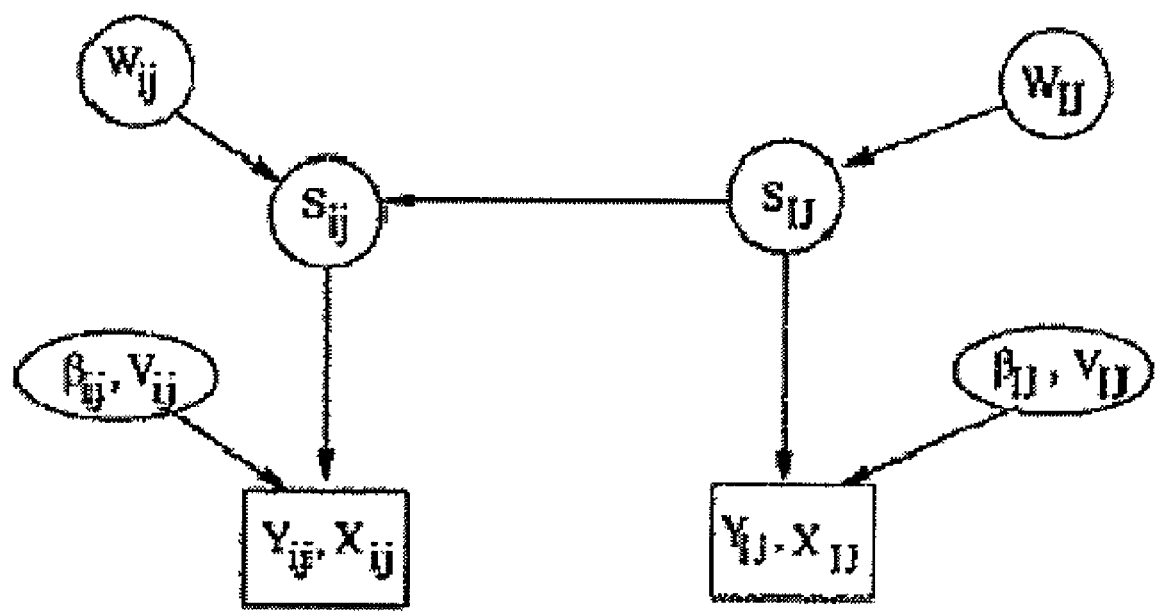
FIG. 6 shows an exemplary embodiment of a generative model for a two level hierarchy according to one embodiment of the present invention.

The $w_r$ is computationally similar to $N(0, W_r)$ for all $r \in Z \setminus Z^{(0)}$. Also, $w_r$ is independent of $S_{pa(r)}$ and $S_{Root} = W_{Root} = 0$. FIG. 6 shows an exemplary embodiment of the generative model for two levels.

In the exemplary embodiment, estimating a separate $W_r$ and $V_r$ for each region may require assuming that all regions at the same level have the same $W_r$ value: $W_r = W^{(l)}$ for all $r \in S^{(l)}$. Modeling assumptions on $V_r$ depend on the data and the tree structure of regions. In the present example, $Var(y_r)$ is proportional to $1/N_r$ (from Equation 5). Thus, assume that there is a V such that $V_r = V/N_r$ for all $r \in S^{(l)}$.

The ratios $W_r/V_r$ determine the amount of smoothing that takes place in the Markovian model. If $W_r$ is large relative to $V_r$, the sibling $S_r$'s are drawn from a distribution that has high variance and hence little smoothing. According to one embodiment, if $W_r/V_r$ is proportional to infinity, then $S_r \to (y_r - u_r^T \beta^{(d(r))})$ and the training data is perfectly fit. On the other extreme, if $W_r/V_r \to 0$, then $S_r \to 0$ and the fit is a regression model given by the covariates, with the maximum possible smoothing.

From the above description, one or more correlations may be implied by the Markovian model. For example, from Equation 7 and the independence of $w_r$ and $S_{pa(r)}$, it follows that:

$$Var(S_r) = \sum_{i=1}^{d(r)} W^{(i)}. \quad (8)$$

Thus, the variance in the states $S_r$ depends only on the depth of region r, and increases when moving from coarser to finer resolutions.

For any two regions $r1$ and $r2$ at depth l sharing a common ancestor q at depth $l' < l$, the covariance between the state values is given by $Cov(S_{r1}, S_{r2}) = Var(S_q)$, which depends only on $l'$. Thus, the correlation coefficient of nodes at level l whose least common ancestor is at level $l'$ is given by $$Corr(l, l') = \frac{\sum_{i=1}^{l'} W^{(i)}}{\sum_{i=1}^{l} W^{(i)}} \quad (9)$$

The correlation coefficient $Corr(l, l')$ depends only on the level of the regions and the distance to their least common ancestor. The $y_r$'s may be independent conditional on $S_r$'s, but the dependencies in $S_r$'s impose dependencies in the marginal distribution of $y_r$'s.

As explained and described above, the EM algorithm may be used to estimate the posterior distribution of $\{S_r\}$'s and $\{\beta^{(d(r))}\}$'s and provide point estimates of the variance components $\{W(l)\}$ and V. Implementation of the EM algorithm may utilize a Kalman filtering step for efficiently estimating the posterior distributions of $\{S_r\}$'s for fixed values of the variance components. The Kalman filtering algorithm itself consists of two steps, namely, a filtering step that aggregates information from the leaves up to the root, followed by a smoothing step that propagates the aggregated information in the root downwards to the leaves. To provide intuition on the filtering step, note that the state equations may be inverted to express parent states in terms of their children's states:

$$S_{pa(r)} = E(S_{pa(r)} | S_r) + (S_{pa(r)} E(S_{pa(r)} | S_r)) \quad (10)$$
$$= B_r S_r + \psi_r$$

where $$B_r = \sum_{i=1}^{d(r)-1} W^{(i)} \bigg/ \sum_{i=1}^{d(r)} W^{(i)}, \quad E[\psi_r] = 0$$

and $$Var(\psi_r) = W^{(d(r))} B_r$$

Beginning with initial estimates for $\{W^{(l)}(0)\}$, V, and $\{\beta^{(d(r))}(0)\}$, the EM algorithm may use these in the Kalman filtering and smoothing steps, recomputing the variance and covariate components, and repeating the process until convergence. At step $l+1$, the EM algorithm first computes the expected log-likelihood of the conditional distribution of all the state variables $\{S_r\}$ given the current estimates of all variance and covariate components $\{W^{(l)}(t)\}$, $V(t)$, $\{\beta_1(t)\}$ and the data $\{y_r\}$. This step uses the posterior distributions of the state variables from the Kalman filtering and smoothing steps. Subsequently, the parameters $\{W^{(l)}(t+1)\}$, $V(t+1)$, $\{\beta_1(t+1)\}$ are determined which maximize the conditional distribution of $\{S_r\}$. The new estimates are used at the next timestep of the EM algorithm.

The Kalman filtering step may be implemented as follows:

Filtering; Define, for all $r \in Z$, the following quantities:

$$e_r = y_r \cdot u_r^T \hat{\beta}^{(d(r))}; \quad B_r = \frac{\sum_{i=1}^{d(r)-1} W^{(i)}}{\sum_{i=1}^{d(r)} W^{(i)}}$$

$$\sigma_r = \sum_{i=1}^{d(r)} W^{(i)}; \quad R_r = B_r W_r = B_r W^{(d(r))}$$

For the leaf regions $r \in Z^{(L)}$, compute:

$$\hat{S}_{r|r} = \sigma_r e_r / (\sigma_r + V_r); \Gamma_{r|r} = \sigma_r V_r / (\sigma_r + V_r)$$

For non-leaf nodes $r \in Z \setminus Z^{(L)}$, let $k_r$ denote the number of children regions under r, and let $c_i(r)$ denote the $i^{th}$ such child. Then, compute:

$$\hat{S}_{r|c_i(r)} = B_{c_i(r)} \hat{S}_{c_i(r)|c_i(r)}$$
$$\Gamma_{r|c_i(r)} = B_{c_i(r)} \Gamma_{c_i(r)|c_i(r)} B_{c_i(r)} + R_{c_i(r)}$$

-continued $$\hat{S}^*_{r|r} = \Gamma^*_{r|r}\left(\sum_{i=1}^{k_r} \Gamma^{-1}_{r|c_i(r)}\hat{S}_{r|c_i(r)}\right)$$

$$\Gamma^*_{r|r} = \left\{\sum_{r}^{-1} + \sum_{i=1}^{k_r}\left(\Gamma^{-1}_{r|c_i(r)} \cdot \sum_{r}^{-1}\right)\right\}^{-1}$$

$$\hat{S}_{r|r} = \Gamma_{r|r}(V_r^{-1}e_r + (\Gamma^*_{r|r})^{-1}\hat{S}^*_{r|r})$$

$$\Gamma_{r|r} = \Gamma^*_{r|r} - \Gamma^*_{r|r}(\Gamma^*_{r|r} + V_r)^{-1}\Gamma^*_{r|r}$$

Smoothing: Set the values $\hat{S}_r = \hat{S}_{r|r}$ and $\Gamma_r = \Gamma_{r|r}$ for all $r \in Z^{(l)}$. For all other levels $r \in Z \setminus Z^{(l)}$, compute:

$$\hat{S}_r = \hat{S}_{r|r} + \Gamma_{r|r}B_r\Gamma_{pa(r)|r}^{-1}(\hat{S}_{pa(r)} - \hat{S}_{pa(r)|r})$$

$$\Gamma_r = \Gamma_{r|r} + \Gamma_{r|r}B_r^2\Gamma_{pa(r)|r}^{-1}(\Gamma_{pa(r)} - \Gamma_{pa(r)|r})\Gamma_{pa(r)|r}^{-1}\Gamma_{r|r}$$

$$\Gamma_{r|pa(r)} = \Gamma_{r|r}B_r\Gamma_{pa(r)|r}^{-1}\Gamma_{pa(r)}$$

Expectation Maximization: Define the following:

$$e_r(t) = y_r \cdot u_r^T\hat{\beta}^{(d(r))}(t)$$

$$Q^{(l)}(t+1) = \frac{\sum_{r \in Z^{(l)}}(\Gamma_r + (\hat{S}_r \cdot e_r^t)^2)\tilde{N}_r}{|Z^{(l)}|}$$

The compute:

$$V(t+1) = \frac{\sum_l |Z^{(l)}| \cdot Q^{(l)}(t+1)}{\sum_l |Z^{(l)}|}$$

$$W^{(l)}(t+1) = \frac{\sum_{r \in Z^{(l)}}(\Gamma_r + \Gamma_{pa(r)} - 2\Gamma_{r,pa(r)} + (\hat{S}_r - \hat{S}_{pa(r)})^2)}{|Z^{(l)}|}$$

The value of $\hat{\beta}^{(l)}(t+1)$ at each level l is obtained by forming a weighted least squares at level l with $V(t+1)$ as estimate of V.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method, comprising:
   electronically, obtaining, via a processing device, a sample set of content items, each of the content items including a plurality of features, each of the features associated with at least one region in a hierarchical data structure, a hierarchical data structure comprising nodes in an advertisement taxonomy hierarchy and nodes in a page taxonomy hierarchy, with the at least one region identified by a combination of nodes from the advertisement taxonomy hierarchy and nodes from the page taxonomy hierarchy, wherein the sample set represents a portion of the content items that are representative of a whole set of content items;

determining a first impression volume for each of the features corresponding to the at least one region as a function of a number of impressions registered for a given content item from the sample set of content items;

applying a scale factor to the first impression volume to generate a second impression volume, the scale factor being selected so that the second impression volume is within a predefined range of a third impression volume;

electronically, estimating, via the processing device, a click-through-rate (CTR) as a function of the second impression volume and a number of clicks on the content item;

computing a difference impression volume as a difference between the first impression volume and the third impression volume; and assigning the difference impression volume to the at least one region as a function of the first impression volume;

wherein the assigning includes: determining a sum of first impression volumes for each region across a level of the hierarchical data structure; and computing a ratio of the first impression volume for a given region to the sum; and multiplying the difference impression volume by the ratio to determine an impression volume addition for the given region; and adding the impression volume addition to the first impression volume of the given region to generate a fourth impression volume.

2. The method according to claim 1, wherein the content items include at least one of webpages and ads.

3. The method according to claim 1, wherein the obtaining includes: identifying first content items that have been clicked; identifying a predetermined number of second content items that have not been clicked; and generating the sample set as a function of the first and second content items.

4. The method according to claim 3, further comprising: calculating the first impression volume as a function of the impressions for the first and second content items.

5. The method according to claim 1, wherein the third impression volume is a total number of impressions associated within a preselected level in the hierarchical data structure.

6. The method according to claim 1, wherein the estimating includes: assigning a state variable to each of the at least one region; and applying a Markovian model to the state variable to estimate the CTR.

7. The method according to claim 6, wherein the applying includes: computing a posterior for the state using a Kalman filter; and propagating the posterior to the at least one region; and repeating the computing and the propagating until convergence of the state variable to the CTR.

8. The method according to claim 7, further comprising: upon the convergence, identifying the CTR for the at least one region.

9. The method according to claim 1, further comprising: storing the CTR on a storage medium.

* * * * *